Patented Nov. 18, 1941

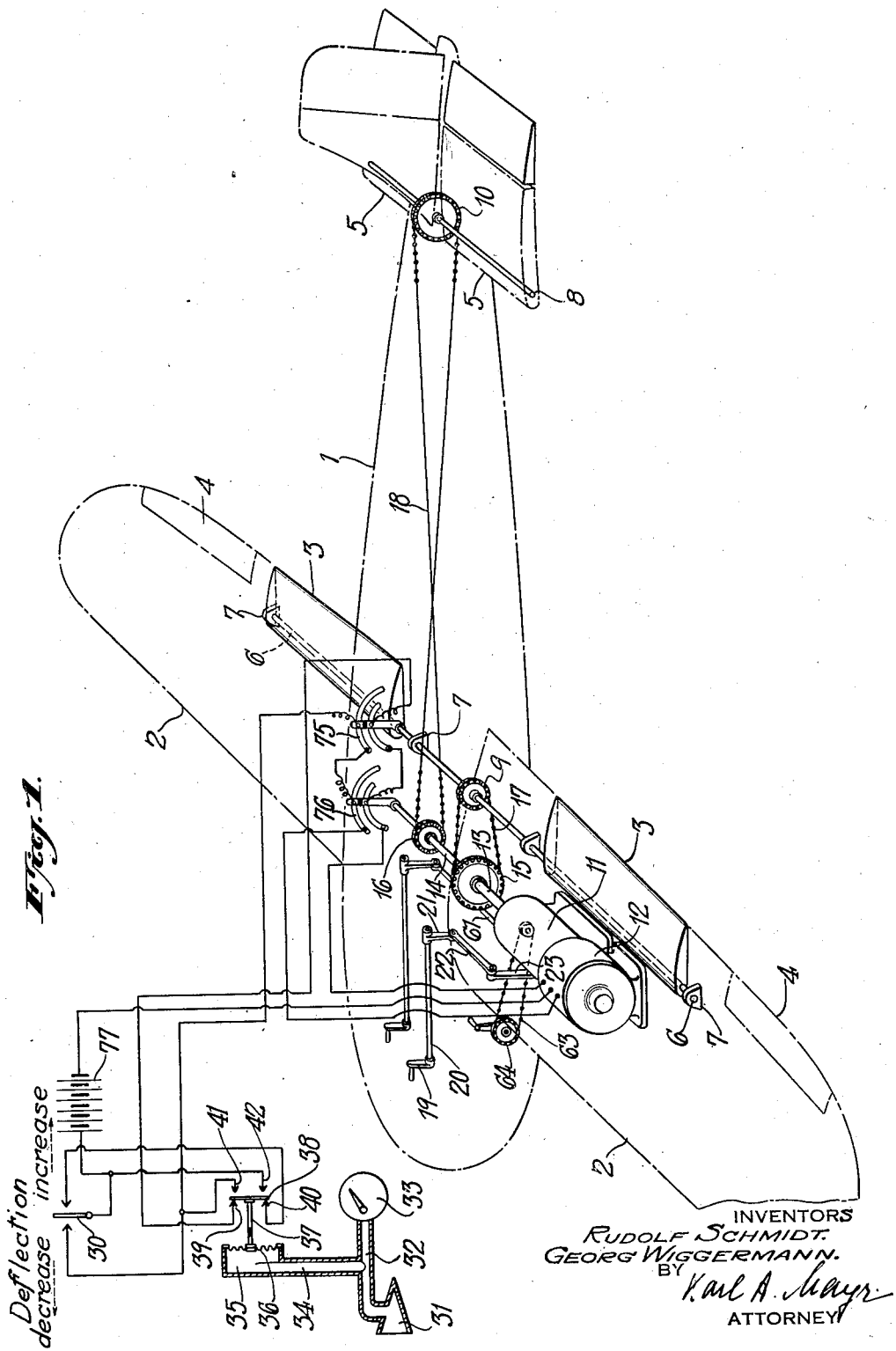

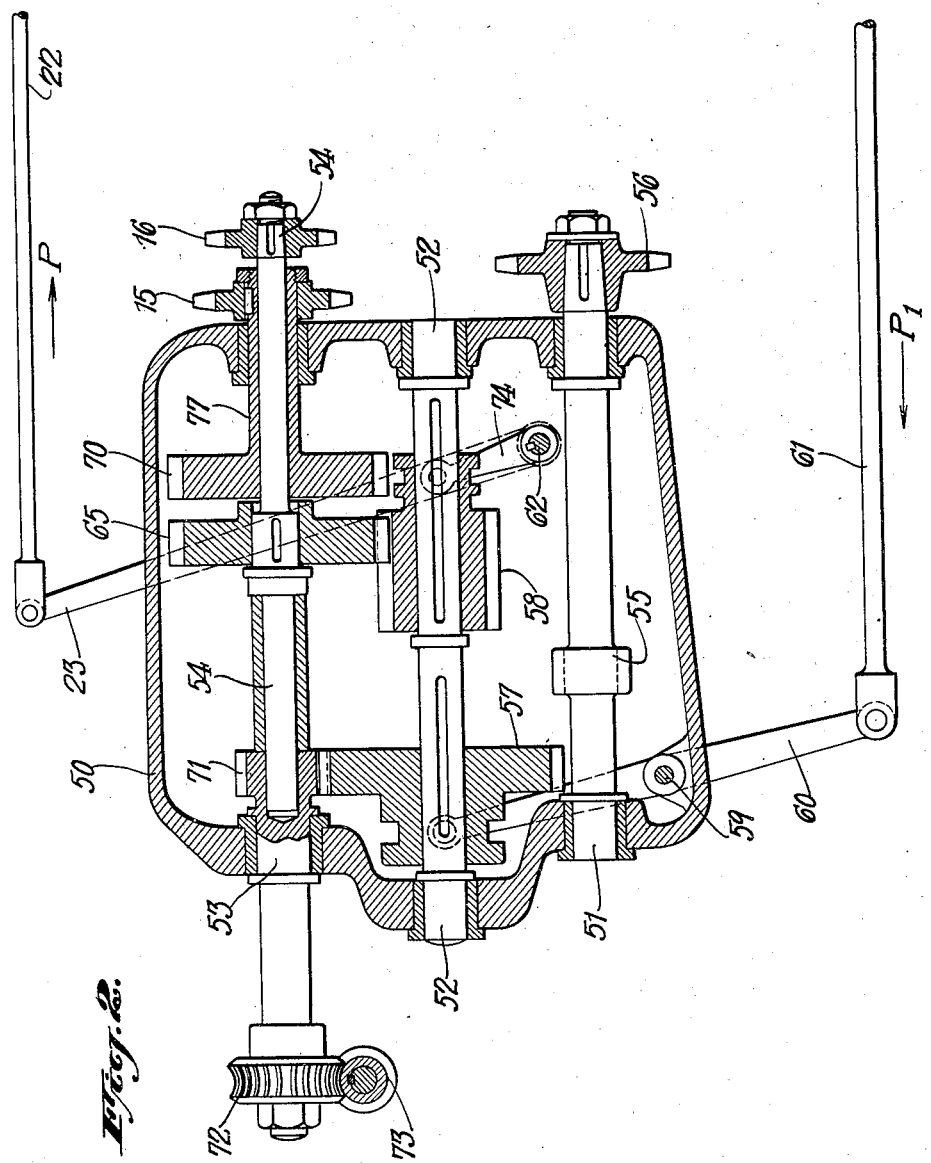

2,262,968

UNITED STATES PATENT OFFICE 2,262,968

AIRPLANE CONTROL

Rudolf Schmidt, Seemoos, near Friedrichshafen-on-the-Bodensee, and Georg Wiggermann, Friedrichshafen-on-the-Bodensee, Germany, assignors to Dornier-Werke G. m. b. H., Friedrichshafen-on-the-Bodensee, Germany Application May 5, 1938, Serial No. 206,156, In Germany May 12, 1937

11 Claims. (Cl. 244—42)

The present invention relates to a new control system for aircraft, more particularly to the control of the landing flaps and the elevator fins in airplanes.

The operation of the landing flaps in the conventional manner requires considerable power. Hand operation therefore is only possible by using transmission gears of great speed reduction and takes an undesirable long time. The moving out of the landing flaps changes the aerodynamic conditions to which the wings are exposed. The center of pressure acting on the wing changes its position and the load distribution is also changed. It is therefore necessary to change the position of the elevator fin simultaneously with that of the landing flaps so that a desired load distribution is maintained. Moving out or deflection of the landing flaps usually causes head heaviness of the airplane; this must be counteracted by giving the elevator a negative angle of attack. It is, however, quite possible that, at certain conditions, tail heaviness of the airplane is produced. In that case the elevator must be so adjusted that the angle of attack is made positive.

If the speed of an airplane with the landing flaps moved outward is much increased, for example when making a nose dive, the strain on the flaps and on the wings is so great that their destruction is possible.

It is an object of the present invention to provide a control system for landing flaps and elevators in airplanes whereby said flaps and elevators are operated by means of a common motor and a suitable gearing. With the new system the movement of the elevator is in a predetermined relation to that of the landing flaps. Preferably said motor is an electric motor; other types of motors may be used, however, without departing from the scope of the present invention. If motors are used which rotate in one direction only, said gearing must comprise a provision for reversing the direction of rotation. If an electric motor is used which is capable of operation in both directions of rotation, said gearing is much simpler and lighter because the reversing provision can be omitted.

Another object of the present invention resides in the provision of a control system for the landing flaps and elevator fins in airplanes which system comprises a common motor for operating said flaps and elevator fins and a gearing which permits individual operation of the elevator fin by said motor without changing the position of the landing flaps. The initial position of the elevator is then different when common operation of the landing flaps and elevator is started.

A further object of the present invention resides in the provision of a safety system which prevents undue strain on the wings and landing flaps when the plane moves at very high speed, for example, when diving. In the case of the provision of an electric motor which is capable to operate in both directions of rotation, said safety system comprises a double switch which is operated by the aerodynamic pressure built up in a suitable instrument when the machine assumes very high speed whereby at a certain increase of the pressure the switch is operated to cause the motor to move the landing flaps into neutral position and the circuit is interrupted which causes the motor to rotate in such direction as to increase deflection of the landing flaps. The deflection of the landing flaps is thus automatically reduced when the speed of the airplane and consequently the wind pressure of the air exceeds a desired limit, for example when the plane is diving. On account of the pressure responsive switch which is used in connection with the system according to the present invention, at too high wind pressure, the pilot cannot deflect the landing flaps because the switch interrupts the electric circuit. If the speed of the plane is reduced, for example, when the plane changes from diving to gliding, the circuit for moving the flaps into neutral position is interrupted and the circuit for increasing the deflection of the flaps is closed so that the landing flaps are automatically deflected.

Observation of the angle of deflection of the landing flaps may be made possible by conventional indicating devices so that the pilot can switch off the current for deflecting the flaps a soon as a desired deflection is obtained. According to the present invention, however, the pilot cannot purposely or by accident, move the flaps further than is desirable and intended by the designer of the plane; to accomplish this, provisions are made for interrupting the flow of operating current as soon as the desired limit of deflection is obtained. Similar provisions are made to interrupt the operating current when the landing flaps are in neutral position. Because of the inertia of the rotor of the operating motor the current supply must be interrupted somewhat prior to the moment at which the landing flaps and/or elevator fins reach their extreme positions.

A further object of the present invention resides in the provision of a gearing, in the system of the type specified, which permits operation of the system by hand or other power when the motor cannot be used or is out of order. With the gearing according to the present invention the motor need not be revolved in such a case. Of course, hand operation requires much more time for setting the flaps and/or elevator at the desired angle. If very fine and/or gradual adjustment for correcting the trim is desired, the pilot may prefer hand operation and the system according to the present invention fully provides for that.

Further and other objects of the present invention will be hereinafter set forth in the accompanying specification and claims and shown in the drawings which, by way of illustration, show what we now consider to be a preferred embodiment of our invention.

In the drawings:

Figure 1 is a diagrammatic isometric illustration of a plane equipped with the mechanism according to the present invention and also shows the electric wiring diagram.

Figure 2 is a longitudinal sectional view of the gearing according to the present invention.

Referring more particularly to the drawings, 1 designates the fuselage, 2 the wings, 3 the landing flaps, 4 the ailerons, 5 the elevators connected with the tail unit. The landing flaps 3 are connected with the shaft 6 which is revolvably supported by means of the bearings 7. The elevator fins are carried by the axle 8 which is fulcrumed to the fuselage. To shaft 6 a sprocket wheel 9 and to shaft 8 a sprocket wheel 10 is connected. The electric motor 12 which is suitable for operation in both directions of rotation drives the gearing 11 and is mounted to a wing 2. From gearing 11 project two concentric shafts 13 and 14 which carry the sprocket wheels 15 and 16 respectively. Wheel 15 drives wheel 9 by means of a chain 17. Sprocket wheel 16 drives wheel 10 by means of a chain 18. The gearing 11 which will be described in detail later on can be controlled by the pilot by means of lever 19 which is connected with shaft 20; shaft 20 is connected by means of crank 21 and connecting rod 22 with the gear shift lever 23. Gearing 11 may be so controlled that upon operation of motor 12 both shafts 13 and 14 are rotated and thereby the landing flaps and the elevator fins are operated simultaneously; gearing 11 can, by proper manipulation of lever 19, also be set in such manner that shaft 14 only is operated and the position of the elevator 5 alone is changed.

The operation of the motor 12 is controlled by the pilot by manipulation of the switch 30. By turning the switch to the left, motor 12 rotates in such direction that the deflection of the landing flaps and/or elevator fins is decreased and by moving the switch to the right the motor rotates in the opposite direction whereby the angle is increased.

Exposed to the air static pressure is a pressure nozzle 31 from which static pressure tube 32 transfers the air pressure to the velocity meter 33. From conduit 32 a conduit 34 is branched off which connects the nozzle 31 with the static pressure chamber 35. Chamber 35 is closed by means of a diphragm 36. With said diaphragm a rod 37 is connected which carries an electricity conducting cross bar 38. This bar is electrically insulated from rod 37. In the position shown, the cross bar 38 electrically interconnects the contacts 39 and 40 whereby the circuit for increasing the deflection of the flaps 3 is closed and the pilot, by moving switch 30 to the right, can produce such an increase. If the air pressure in nozzle 31 and thereby in chamber 35 increases the diaphragm 36 is bent to the right and the current flow at the contacts 39 and 40 interrupted. Bar 38 is then pressed to the contact points 41 and 42 and an electric circuit is automatically closed which causes the motor 12 to rotate in such direction that the flaps 3 and/or fins 5 are moved into neutral position. In this position of the bar 38 it is not possible to close the electric circuit for increasing the deflection. If the pressure in chamber 35 is reduced, cross bar or plate 38 electrically connects again contacts 39 and 40 and the landing flaps are deflected or lowered provided the pilot has left switch 30 in right position as seen in Fig. 1.

In order to prevent overturning of landing flaps 3 or elevator fins 5 switches 75 and 76 are provided. Switch 75 cuts off the electric circuit which operates motor 12 in such direction as to turn the landing flaps clockwise shortly before said flaps reach their farthest clockwise turning position and does not interrupt the circuit for operating the motor in opposite direction. It also cuts off the electric circuit which causes counterclockwise motion of said flaps shortly before they reach farthest counterclockwise turning position; at this point also the circuit for running the motor in opposite direction is not interrupted. Switch 76 which prevents overturning of the elevator fins is constructed on the same principle. 77 designates a source of electricity for operating motor 12.

The gearing 11 is shown in larger scale in Fig. 2. 50 is the casing which contains three shafts of which two, namely 51 and 52, extend through the whole casing. The top shaft consists of two shafts 53 and 54, part of the latter being concentric and rotatable within the former. A spur gear 55 is rigidly connected with the bottom shaft 51 and is located within casing 50. A sprocket wheel 56 is rigidly connected with a part of shaft 51 which extends outside of casing 50. Wheel 56 may be operated by hand or an auxiliary driving means and is for this purpose connected by means of a chain 63 with a crank 64 or suitable driving means. The chain and crank drive 63, 64 is diagrammatically shown in Fig. 1. Spur gears 57 and 58 are axially movably, but not rotatably connected with shaft 52. Spur gear 57 can be axially moved by means of double lever 60 and connecting rod 61; lever 60 is swingably connected with casing 50 by means of shaft 59. Spur gear 65 and sprocket wheel 16 are keyed to shaft 54. Wheel 16, by means of a chain 18, operates the elevator fins as can be seen in Fig. 1.

Spur gear 70 is revolvable with respect to shaft 54 and is provided with an extension 77 which projects outside of casing 50 and carries the sprocket wheel 15. The latter, by means of chain 17, is connected with sprocket wheel 9 for operating the landing flaps 3.

The part of shaft 53 which is inside of casing 50 forms a spur wheel 71; the part of said shaft which extends outside of the casing carries a pinion 72 which is driven by a worm 73 which is connected with and driven by the motor 12. The worm gear 72, 73 reduces the speed and also prevents change of position of the landing flaps and elevator fins when motor 12 is not operated.

With the various parts of gearing 11 in the positions shown in Fig. 2, motor 12 drives shaft 52 by means of spur gears 71, 57 and shaft 52 drives shaft 54 by means of the spur gears 58, 65. Sprocket wheel 16, by means of chain 18, drives the sprocket wheel 10 and thereby operates the elevator fins.

If rod 22 is moved in the direction of the arrow P levers 23 and 74, which are mounted on shaft 62 which latter is rotatably carried by casing 50, move spur gear 58 to the right so that wheels 65 and 70 are both engaged and not only the sprocket wheel 15 but also wheel 16 is operated. As is obvious from Fig. 1 with this mode of operation, landing flaps 3 and elevator fins 5 are operated simultaneously.

If rod 61 is moved in the direction of arrow P₁ double lever 60 moves spur gear 57 on shaft 52 to disengage spur gear 71 and engage spur gear 55 of shaft 51. Worm gear 72, 73 and motor 12 are thereby completely disengaged and the gearing 11 can freely be operated by means of crank 64 or other auxiliary drive.

While we believe the above described embodiments of our invention to be preferred embodiments, we wish it to be understood that we do not desire to be limited to the exact details of design and construction shown and described, for obvious modifications will occur to a person skilled in the art.

We claim:

1. In an airplane, a landing flap, an elevator fin, a motor, a transmission having a primary member which is connected with and driven by said motor, said transmission including secondary members which are individually connected with and operate said flap and fin and a coupling means which, according to its position, either individually or jointly connects said primary member with said secondary members.

2. In an airplane, a landing flap, an elevator fin, a motor, a transmission having a primary member which is connected with and driven by said motor, said transmission including secondary members which are individually connected with and operate said flap and fin and a coupling means which individually connects said primary member with said secondary members.

3. In an airplane, a landing flap, an elevator fin, a motor, a transmission having a primary member which is connected with and driven by said motor, said transmission including secondary members which are individually connected with and operate said flap and fin and a coupling means adapted to connect the secondary member which is connected with and operates said fin with said primary member for individual operation of said fin by said motor, or to connect said primary member with all said secondary members for simultaneous operation of said flap and fin by said motor.

4. In an airplane, a landing flap, a source of power, power transmitting means interconnecting said source and flap for deflecting said flap out of its normal flying position, other power transmitting means interconnecting said source and flap for moving of said flap into normal flying position, power transmission interrupting and connecting means interposed in said power transmitting means, airplane speed sensitive means connected with and operating said power transmission interrupting means and preventing power transmission by said first mentioned transmitting means at excessive speed of said airplane.

5. In an airplane, a landing flap, a source of power, power transmitting means interconnecting said source and flap for deflecting said flap out of its normal flying position, other power transmitting means interconnecting said source and flap for moving of said flap into normal flying position, power transmission interrupting means, airplane speed sensitive means connected with and operating said power transmission interrupting means and preventing power transmission by said first mentioned transmitting means and causing power transmission by said other transmitting means at excessive speed of said airplane.

6. In an aircraft, a motor, a plurality of individual flap members, a power transmission having a primary member which is connected with and driven by said motor, a plurality of secondary members which are individually connected with and individually drive said flap members, coupling means adapted to individually or jointly connect said primary member and one or all of said secondary members.

7. In an aircraft, a motor, a plurality of individual flap members, a transmission having a primary member which is connected with and driven by said motor, a plurality of secondary members which are individually connected with and individually drive said flap members, a coupling means adapted to individually or jointly connect said primary member and one or all of said secondary members, an auxiliary driving member, and coupling means interposed between said primary member and said first mentioned coupling means and between said auxiliary driving member and said first mentioned coupling means and being adapted to connect said first mentioned coupling means with either said primary member or said auxiliary driving member.

8. In an aircraft, a motor, a plurality of individual flap members, a transmission having a primary member which is connected with and driven by said motor, a plurality of secondary members which are individually connected with and individually drive said flap members, an auxiliary driving member, and coupling means adapted to individually or jointly connect said primary member and one or all of said secondary members or to individually or jointly connect said auxiliary member and one or all of said secondary members.

9. In an aircraft, a motor, a plurality of individual flap members, a transmission having a primary member which is connected with and driven by said motor, a plurality of secondary members which are individually connected with and individually drive said flap members, an intermediate member, a coupling means adapted to individually or jointly connect said intermediate member and one or all of said secondary members, an auxiliary driving member, and coupling means interposed between said primary member and said intermediate member and between said auxiliary driving member and said intermediate member and being adapted to connect said intermediate member with either said primary member or said auxiliary driving member.

10. In an aircraft, a plurality of different sets of flap members, individual drive members which are individually connected to and individually drive said different sets of flap members, two independent drive means, a drive element, coupling means connected with said element and jointly or individually connecting said individual drive members with said drive element, and other coupling means connected with said drive element and operatively connecting said element either with one or the other of said drive means for operating said sets either by means of one or of the other of said drive means.

11. In an aircraft, a plurality of sets of aerodynamically differently acting elements, a transmission unit including individual drive members individually connected to and individually driving said sets of elements, two independent drive means, coupling means associated with said unit and jointly or individually operatively connecting said individual drive members with one of said drive means for operating all or one of said sets by means of one of said driving means, and another coupling means associated with said unit for operatively connecting either one or the other of said drive means with said first mentioned coupling means for operation of either all or one of said sets by means of either one or the other of said drive means.

RUDOLF SCHMIDT.
GEORG WIGGERMANN.